United States Patent Office 3,466,996
Patented Sept. 16, 1969

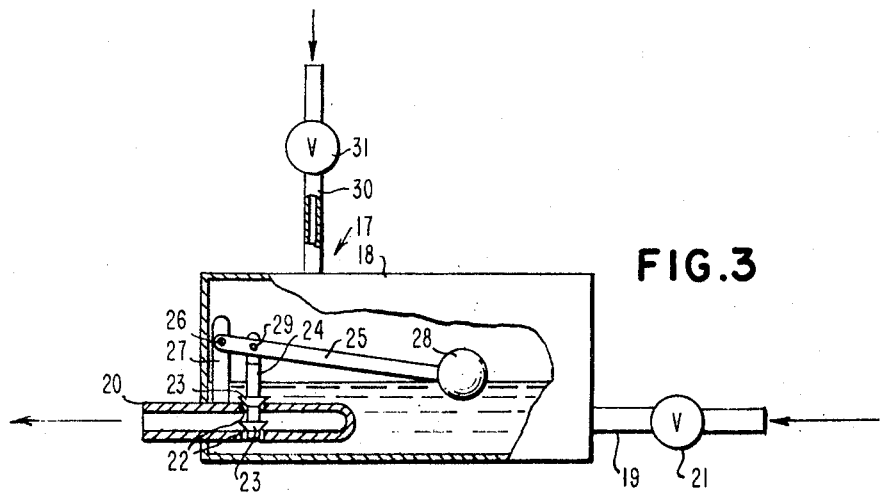

3,466,996
APPARATUS FOR PREVENTING PREMATURE FLASHING IN A PROCESSING SYSTEM
William Albert Sommer, Elgin, Ill., assignor to Borden, Inc., New York, N.Y., a corporation of New Jersey
Filed Sept. 19, 1967, Ser. No. 668,861
Int. Cl. B65b 55/06
U.S. Cl. 99—251                             1 Claim

ABSTRACT OF THE DISCLOSURE

This invention relates to an apparatus for preventing premature flashing of a liquid mixture during the processing of an edible fluid, which comprises a compartment, means for delivering the edible fluid to said compartment in a liquid mixture state, means within the compartment responsive to the liquid mixture accumulated therein to effect passage of said liquid therefrom upon the accumulating of a specified volume, and regulating means associated with said compartment so as to maintain the edible fluid accumulated therein in the liquid mixture state.

Background of the invention

In recent years a trend has developed toward ultra-high temperature processing of edible fluids and particularly of fluid milk products. Several commercially manufactured units available for heating such fluids to various high temperatures have been introduced which may be classified generally as either the heat exchanger (plate or tubular) type or the type comprising a direct steam injection wherein a high temperature steam is mixed with the fluid product at a high velocity.

A number of potential advantages which have been realized from the latter systems are better keeping quality in the finished fluid product, removal of volatile flavor compounds when vacuum treatment is included after holding the fluid at a high temperature, and better process control in terms of quality characteristics of the finished product. Despite the potential advantageous results that can be attained from this method of high temperature heating an edible fluid, very little emphasis has been placed on the instrumentation and control of the system during the process. However, since direct steam injection heating has become more wide-spread, it is desirable to have a system that may be properly controlled in order to obtain optimum results in the processing of the fluid.

One of the major problems encountered in utilizing a system of this type has been to maintain or hold the liquid condition during the passing or conducting of the edible fluid from the heating state to the cooling state. Usually, a manually operated discharge valve is provided between the heating and cooling stage of the system, and as a result some experience and skill is required to make the necessary adjustments quickly in order to maintain the liquid mixture state attained from the heating operation and at the same time prevent premature flashing or vaporization of the liquid mixture being conducted to the cooling apparatus of the system. In many instances, the use of an inexperienced worker in control of this system has resulted in great wastage of fluid and consequent loss of capital.

Summary of the invention

The present invention overcomes the heretofore stated problems in the processing of an edible fluid which utilizes a steam injection heating media by providing an apparatus which automatically is responsive to the accumulation of a volume of liquid mixture and thereupon permits passage of the liquid mixture to the cooling media of the system, while at the same time insuring that the fluid will be retained in the liquid mixture state to prevent premature flashing or vaporization thereof.

Briefly stated, the present invention comprises an apparatus for preventing premature flashing or vaporization of the liquid mixture which includes a compartment for receiving the fluid, means for delivering the fluid to the compartment in its liquid mixture state from the heating media of this system, means within the compartment responsive to the accumulation of liquid mixture received therein to permit passage of the liquid mixture therefrom into the cooling media of the system, and regulating means responsive to the environmental conditions of the compartment to maintain the liquid mixture state of the fluid.

Brief description of the drawing

The various features of the apparatus of this invention will become apparent from the following detailed description set forth in connection with the accompanying drawing which relates to the preferred embodiment of the present invention and is given by way of illustration.

FIGURE 1 is a schematic diagram illustrating the steam injection processing system of the preferred embodiment of the present invention.

FIGURE 2 is a detailed cross-sectional view partially broken away to illustrate the closed position of the apparatus of the present invention.

FIGURE 3 is a cross-sectional view partially broken away to illustrate the apparatus of the present invention in the open position which allows the liquid mixture to pass through the compartment.

Detailed description of the invention

Referring to FIGURE 1 on the drawing which sets forth the preferred embodiment of the instant invention, there is illustrated a direct steam injection system used for processing edible fluids or fluid milk products which is of the type described in detail in volume 45, No. 7, Journal of Dairy Science at page 937 in the July 1962 issue which is titled "Direct-Steam Injection System for Processing Fluid Milk Products" by W. M. Roberts and C. W. Dill.

The system as set forth in the aforementioned magazine article comprises a pre-heat vat 10 wherein is placed the edible fluid or fluid milk product to be processed which heats it to a suitable pre-injection temperature. Upon attaining the desired temperature, the fluid is conveyed to homogenizer 11 which performs its intended function and in turn conveys the fluid into the steam injection heater 13 of the present invention. A source of steam is supplied at one end of the injection heater 13 which is mixed with the edible fluid at high temperature and velocity, thereby rendering the fluid in a liquid mixture state and at a high energy level. The liquid mixture state of the fluid is then conveyed into a holding tube arangement 15 which comprises a plurality of lenghts of tubing 16 which are heavily insulated or otherwise provided to insure against energy loss. The edible fluid in the liquid mixture state is conducted through the tubing 16 over a predetermined interval of time so that the liquid mixture state is held or maintained at the high energy level to effect the processing step of this process in this type of system. The system is arranged so that the liquid mixture state of the edible fluid is to be de-energized in a subsequent removal process which in the preferred embodiment is in the form of a cooling media at the end of the system. It has been found that optimum results are achieved when the liquid mixture state of the fluid is maintained in the holding tubes for periods of time ranging from 2 seconds to approximately 180 seconds, although this range is not critical, and the range is outlined in the aforementioned magazine article.

After the liquid mixture has been conducted to the holding tubes 16, it is received by the inlet tube 19 which supplies the mixture to the apparatus 17 of the present invention which is designed to maintain the liquid mixture state prior to passage of the fluid into the cooling media of the system. By maintaining the fluid in its liquid mixture state prior to passage to the cooling media there is prevented any premature flashing of the liquid mixture, which is critical in the carrying out of the desired steps of this system.

Referring now to the apparatus 17 of the present invention illustrated with particularity in both FIGURES 2 and 3 of the drawings, there is set forth a compartment 18 which communicates with the inlet tube 19, as well as an outlet tube 20. A conventional check valve 21 is provided adjacent the inlet tube 19 to insure continuous flow in one direction of the liquid mixture into the compartment 18. As seen on the drawing, the outlet tube 20 projects inwardly into the compartment 18 and is provided with a pair of aligned ports 22, which are diametrically opposedly arranged on the tube. A valve pin 24 having stoppers or other suitable closure means 23 vertically spaced along the length thereof is arranged in the opening formed by the ports 22, as best seen in FIGURES 2 and 3, so as to simultaneously engage the ports 22 in the closed position shown in FIGURE 2. Accordingly, as the pin 24 is moved upwardly from the position illustrated in FIGURE 2, both ports 22 are opened and passage of the fluid in the liquid mixture state through the outlet tube 20 is permissible.

To actuate the valve pin 24, there is provided an arm 25 which is pivotally connected at one end by pin 26 to an upstanding support or stanchion 27 mounted adjacent the outlet tube 20. At the other end of the arm 25 is a float or buoyant ball 28 which is adapted to ride on the liquid mixture contained in the compartment and move in accordance with the fluctuations of the level or volume of liquid mixture received therein. The valve pin 24 is pivotally connected to the arm 25 intermediate the ends of the latter by a pin 29. Thus, as the liquid mixture of the fluid in the compartment 18 rises from increased flow of the fluid from the inlet tube 19, the float or buoyant ball 28 floats upwardly, thereby actuating valve pin 24 to open the openings 22 and permit passage of the liquid mixture to the vacuum cooling chamber. It should be appreciated that the tube 20 which projects inwardly into the compartment 18 is so oriented with respect to the pivotal movement of arm 25 that the ports 22 will always be immersed in the liquid mixture in the compartment before the buoyant ball 28 floats to a level to effect passage of the liquid through tube 20. It is thus seen that a valve opening arrangement is provided which is responsive to the volume of liquid mixture in the chamber and is only opened when a sufficient volume or level of liquid mixture is in the compartment to restrict or limit pasage through outlet 20 to a liquid mixture.

An external source of steam illustrated in FIGURES 2 and 3 is provided to maintain the environmental conditions of the compartment 18 to insure that a liquid mixture state of the fluid being worked on is at all times maintained in the chamber 18. Thus an inlet tube 30 supplies steam to the chamber 18 and a constant pressure inlet valve 31 which is responsive to the pressure within the compartment 18 controls or regulates the flow of steam thereinto whereby the liquid mixture state of the fluid is maintained in the same condition as it was during the time it was conducted through the holding tubes 16. Therefore, any premature flashing or vaporization of the liquid mixture prior to the time it is conveyed from the compartment 18 through the tube 20 is prohibited.

The apparatus 17 of the present invention automatically carries out its intended function of maintaining the chemical state of the edible fluid during processing and removes the need for any manual operation of a discharge valve or other needed hardware to effect passage into the vacuum cooling chamber. As the liquid mixture is conveyed from the compartment 18 into outlet port 20 it is received in vacuum cooling chamber 32 where it is flashed or vaporized and the steam is removed from the edible fluid and a discharge pump 33 associated with the vacuum chamber removes the fluid and conveys it away for bottling and other subsequent steps.

Although one embodiment of the present invention has been herein illustrated and described, it will be evident to those skilled in the art that various modifications may be incorporated into the details of production without departing from the principles herein set forth. For example, it should be understood that fluids other than edible fluids or fluid milk products which are to be processed by high temperature heating may utilize the injection heating system and flash preventing apparatus of the present invention without departing from the scope of this invention. Moreover, it should also be understood the use of steam in the injection heating media and regulating means 30, 31 is given by way of example only and any other gas which will effect and maintain the liquid mixture state of the fluid being treated might be utilized without exceeding the purview of the instant concept.

What is claimed is:

1. Apparatus for maintaining the liquid mixture state of an edible fluid which is conveyed from a steam injection heater to a vacuum chamber cooler and which is interposed between said heater and said cooler comprising a compartment into which the liquid mixture is received including an inlet tube from the heater and outlet tube to the cooler, said inlet and outlet tube being disposed in substantially the same horizontal plane and being substantially axially aligned, said outlet tube projecting into said compartment and including at least one opening, a vertically shiftable valve pin in said compartment having a closure stopper thereon adapted to open and close said opening in said cooler outlet tube, an arm in said compartment pivotally connected at one end thereof and having a float at the other, said valve pin being pivotally attached to said arm intermediate the ends of the latter whereby said opening in said outlet tube may be opened in response to the volume of liquid in said compartment by elevation of said float, and a tube to connect a steam source to said compartment, a pressure control valve mounted on said tube responsive to the pressure in said compartment so as to regulate the flow of steam thereto in order to maintain the compartment at a prescribed temperature and pressure to insure that the state of liquid mixture does not vaporize prior to passage into the cooler.

References Cited

UNITED STATES PATENTS

| | | | |
|---|---|---|---|
| 2,019,491 | 11/1935 | Grindrod | 99—251 |
| 2,182,335 | 12/1939 | Davis | 99—251 XR |
| 2,314,455 | 3/1943 | Murray | 99—251 |
| 2,815,289 | 12/1957 | Murray | 99—251 XR |
| 2,902,048 | 9/1959 | Ryan | 99—251 XR |
| 3,156,176 | 11/1964 | Wakeman et al. | 99—251 |

ROBERT W. JENKINS, Primary Examiner